(12) United States Patent
Koyama (10) Patent No.: US 6,443,537 B2
(45) Date of Patent: Sep. 3, 2002

(54) HYDRAULIC ACTUATOR FOR AN ANTI-LOCK BRAKING SYSTEM (75) Inventor: Fumitoshi Koyama, Kariya (JP)

(73) Assignee: Denso Corporation, Kariya (JP)

( * ) Notice: Subject to any disclaimer, the term of this patent is extended or adjusted under 35 U.S.C. 154(b) by 6 days.

(21) Appl. No.: 09/808,955

(22) Filed: Mar. 16, 2001

(30) Foreign Application Priority Data

Mar. 17, 2000 (JP) ........................................ 2000-081826

(51) Int. Cl.[7] ................................................. B60T 8/36
(52) U.S. Cl. ................... 303/119.3; 303/119.2; 303/DIG. 10
(58) Field of Search ................... 303/119.3, 119.2, 303/116.4, DIG. 10

(56) References Cited

U.S. PATENT DOCUMENTS

| | | | | |
|---|---|---|---|---|
| 3,538,947 A | * | 11/1970 | Leimen et al. | 137/550 |
| 4,349,233 A | * | 9/1982 | Bullard et al. | 180/197 |
| 5,022,717 A | * | 6/1991 | Heibel et al. | 303/119.3 |
| 5,035,469 A | * | 7/1991 | Geilen et al. | 303/116.1 |
| 5,244,262 A | * | 9/1993 | Kehl et al. | 137/596.17 |
| 5,460,438 A | * | 10/1995 | Hellmann et al. | 138/30 |
| 5,975,652 A | * | 11/1999 | Otto | 303/113.1 |
| 6,234,199 B1 | * | 5/2001 | Nohira | 137/557 |
| 6,270,170 B1 | * | 8/2001 | Isogai et al. | 303/119.3 |

FOREIGN PATENT DOCUMENTS

| | | |
|---|---|---|
| JP | 5-97029 | 4/1993 |
| JP | 7-47944 | 2/1995 |

* cited by examiner

Primary Examiner—Jack Lavinder
Assistant Examiner—Benjamin A Pezzlo
(74) Attorney, Agent, or Firm—Harness, Dickey & Pierce, PLC (57) ABSTRACT A cup-shaped diaphragm is inserted into a bore formed in a housing. An inlet opening of the bore is closed by a plug-like wall member. A conduit line extends obliquely with respect to an axis of the bore from an annular space formed between a cylindrical wall of the bore and a protruding portion of the plug-like wall member. The annular space is connected to a pressurizing control valve via the conduit line. A chamber, partitioned from the annular space by the cup-shaped diaphragm, serves as a damper chamber which has a diameter substantially equivalent to a diameter of the bore.

39 Claims, 4 Drawing Sheets

HYDRAULIC ACTUATOR FOR AN ANTI-LOCK BRAKING SYSTEM

BACKGROUND OF THE INVENTION

The present invention relates to a hydraulic actuator preferably used for controlling braking fluid of an anti-lock braking system (hereinafter, abbreviated by ABS) installed in an automotive vehicle.

In the anti-lock braking system, the hydraulic actuator is operated to precisely and promptly increase and decrease the hydraulic pressure of each wheel cylinder in accordance with rotational conditions of each wheel to prevent the wheel from locking during the braking operation.

SUMMARY OF THE INVENTION

An object of the present invention is to secure a sufficient damper capacity for an ABS actuator to reduce the noise caused during an ABS operation.

To accomplish the above and other related objects, the present invention provides a first ABS actuator comprising a housing having a first predetermined surface where a bore is formed. A damper, defined in the bore, has an axis extending in a depth direction of the bore. A cup-shaped diaphragm, disposed in the bore, divides an inside space of the bore into a first chamber and a second chamber. The cup-shaped diaphragm has an opening at one axial end and a bottom at an opposed axial end. The opening of the cup-shaped diaphragm becomes a leading side when the cup-shaped diaphragm is inserted into the bore. A plug-like wall member closes an opening of the bore. A damper chamber is constituted by the first chamber and includes an inside space of the cup-shaped diaphragm. The housing has a second predetermined surface where a control valve is installed. The second predetermined surface is substantially perpendicular to the first predetermined surface. The housing has a third predetermined surface where a first port is formed. The third predetermined surface is substantially perpendicular to the first predetermined surface and is opposed to the second predetermined surface. And, a main conduit line connects the first port to the control valve.

In this first ABS actuator, the plug-like wall member has a protruding portion for pushing the bottom of the cup-shaped diaphragm. The protruding portion is spaced from a cylindrical wall of the bore. An annular space is formed between the protruding portion and the cylindrical wall of the bore. The annular space constitutes the second chamber. And, a first conduit line has its inlet opened to the annular space provided around the protruding portion and extends from the annular space as part of the main conduit line.

With this arrangement, the damper diameter can be increased to a level equivalent to the diameter of the bore. This realizes a large damper capacity. Thus, it becomes possible to reduce the noise caused during the ABS operation.

Furthermore, the present invention provides a second ABS actuator comprising a housing having a first predetermined surface where a bore is formed. A damper, defined in the bore, has an axis extending in a depth direction of the bore. A cup-shaped diaphragm, disposed in the bore, divides an inside space of the bore into a first chamber and a second chamber. The cup-shaped diaphragm has an opening at one axial end and a bottom at an opposed axial end. The opening of the cup-shaped diaphragm becomes a leading side when the cup-shaped diaphragm is inserted into the bore. A plug-like wall member closes an opening of the bore. A damper chamber is constituted by the first chamber and includes an inside space of the cup-shaped diaphragm. The housing has a second predetermined surface where a control valve is installed. The second predetermined surface is substantially perpendicular to the first predetermined surface. The housing has a third predetermined surface where a first port is formed. The third predetermined surface is substantially perpendicular to the first predetermined surface and is opposed to the second predetermined surface. A second port is formed on the first predetermined surface where the damper is installed. And, a main conduit line is formed in the housing so as to communicate with the second chamber. The main conduit line connects the first port to the second port via the control valve.

In this second ABS actuator, the first port is offset from the control valve in an axial direction of the damper. The control valve is located far from the first predetermined surface compared with the first port. And, the main conduit line connects the second chamber to the control valve via a first conduit line extending obliquely with respect to the axis of the damper from a cylindrical wall of the bore.

In this manner, providing the first conduit line extending obliquely with respect to the axis of the damper from the cylindrical wall of the bore makes it possible to connect the second chamber to the control valve under a condition where the first port is offset from the control valve in the axial direction of the damper and the control valve is located far from the first predetermined surface compared with the first port. Accordingly, in addition to the above-described effect of the first ABS actuator, it becomes possible to downsize the housing in the axial direction of the damper.

In the above-described second ABS actuator, It is preferable that the plug-like wall member has a protruding portion for pushing the bottom of the cup-shaped diaphragm. And, the protruding portion is spaced from the cylindrical wall of the bore. An annular space is formed between the protruding portion and the cylindrical wall of the bore constitutes the second chamber. The first conduit line has its inlet opened to the annular space provided around the protruding portion. With this arrangement, it becomes possible to fix the position of the cup-shaped diaphragm by the protruding portion.

According to a preferred embodiment of the present invention, the protruding portion of the plug-like wall member is a circular protruding portion formed at an inner end of the plug-like wall member. A diameter of the circular protruding portion is smaller than that of a main body of the plug-like wall member. The circular protruding portion presses the bottom of the cup-shaped diaphragm when the plug-like wall member is inserted into the bore, so that an insertion amount of the circular protruding portion substantially determines an axial position of the cup-shaped diaphragm in the bore.

Preferably, the cylindrical protruding portion is spaced from the cylindrical wall of the bore when the plug-like wall member is inserted in the bore so as to close the opening of the bore, so that the second chamber surrounds the cylindrical protruding portion of the plug-like wall member.

According to the preferred embodiment of the present invention, the main conduit line further comprises a second conduit line which extends from the control valve in a direction substantially perpendicular to the second predetermined surface and is connected to the first conduit line.

The pressurizing control valve is offset from the annular space provided around the protruding portion of the plug-like wall member in a direction normal to the first predetermined surface. The first conduit line extends straight and obliquely from the annular space and is connected to the second conduit line.

For example, two control valves are installed adjacent to each other on the second predetermined surface. One of the two control valves is directly connected to the first conduit line via the second conduit line. And, the other of the two control valves is connected to the first conduit line via the second conduit line and a third conduit line connecting the two control valves.

In this manner, when two control valves are disposed adjacent to each other, it is desirable that one of two control valves is directly connected to the first conduit line via the second conduit line. The other control valve can be connected to the first conduit line via the second and third conduit lines.

Furthermore, it is preferable that a through-hole is opened on the bottom of the cup-shaped diaphragm. The through-hole serves as an orifice connecting the first chamber to the second chamber.

In this case, it is further preferable that a region where the through-hole is opened is thin in thickness compared with the remaining portion of the bottom of the cup-shaped diaphragm. For example, a recessed region is formed on the bottom so as to surround the through-hole. The recessed region has a sufficient depth so that a burr formed around the through-hole remains in a retracted position with respect to a surface of the bottom.

Although the burr is inherently produced along an annular periphery of a through-hole during a formation of the through-hole, the above-described arrangement prevents the burr from protruding from the surface of the bottom. Thus, it becomes possible to prevent the burr from peeling off the cup-shaped diaphragm.

Furthermore, it is preferable that the cup-shaped diaphragm has a press-fitting portion partly formed on a cylindrical wall thereof. The press-fitting portion has an enlarged diameter larger than the diameter of other portion of the cup-shaped diaphragm. And, the cup-shaped diaphragm is firmly fixed in the bore by the press-fitting portion.

Preferably, the press-fitting portion protrudes radially outward from a surface of the cylindrical wall of the cup-shaped diaphragm. The press-fitting portion extends in a circumferential direction of the cylindrical wall of the cup-shaped diaphragm.

In this manner, forming the press-fitting portion on the cylindrical wall of the cup-shaped diaphragm makes it possible to firmly fix the cup-shaped diaphragm in the bore.

Moreover, it is preferable that an opening periphery of the cup-shaped diaphragm is squeezed in diameter compared with other portion of the cup-shaped diaphragm.

Preferably, the opening periphery of the cup-shaped diaphragm is curled radially inward so as to have a smaller diameter compared with a cylindrical wall of the cup-shaped diaphragm, so that the cup-shaped diaphragm can be easily inserted into the cylindrical bore from the opening periphery of the cup-shaped diaphragm.

In this manner, squeezing the diameter of the opening periphery of the cup-shaped diaphragm makes it possible to easily insert the cup-shaped diaphragm in the bore.

Preferably, the cup-shaped diaphragm has a diameter substantially identical with that of the bore. The cup-shaped diaphragm has an axis identical with that of the bore.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF PREFERRED EMBODIMENTS

Fundamental Arrangement

The inventor has previously proposed a compact ABS actuator in an earlier unpublished patent application (i.e., the Japanese patent application No. 11-8145).

Figure 4:
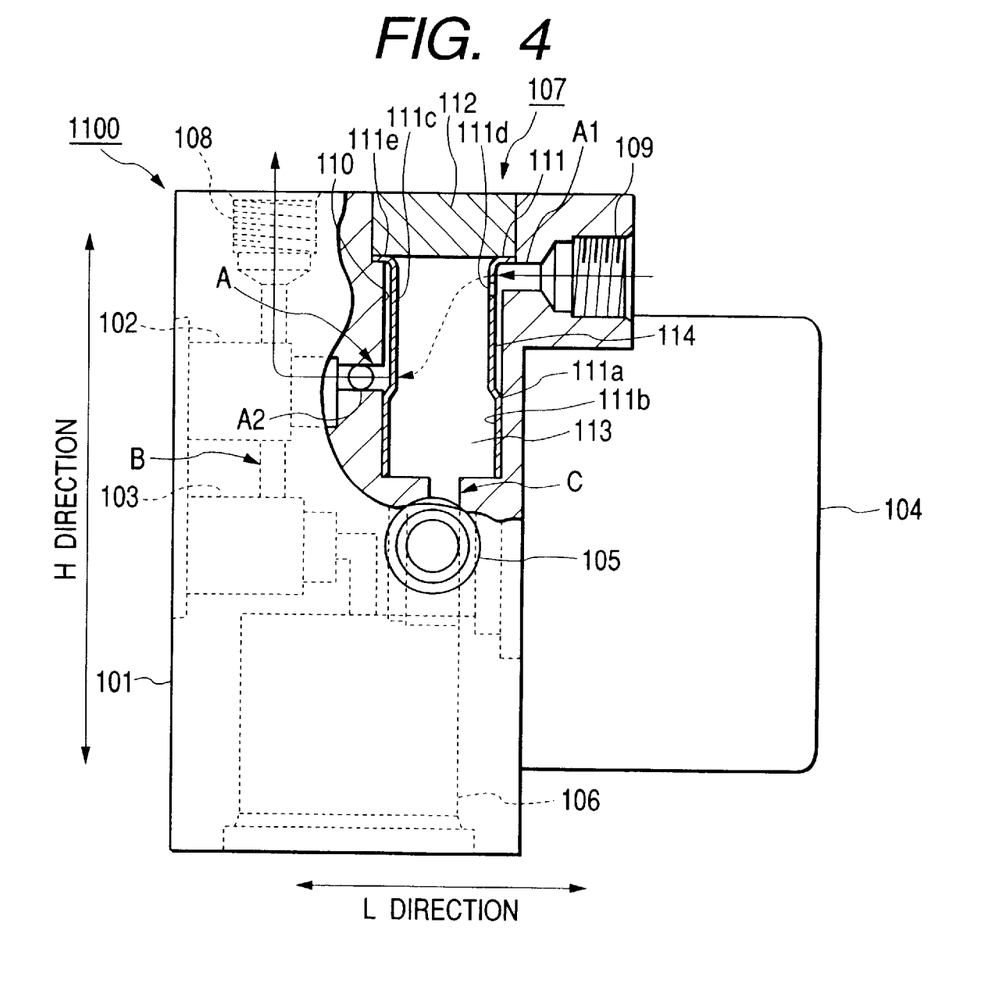
FIG. 4 is a partly cross-sectional view showing an ABS actuator previously proposed by the inventor of the present application.

FIG. 4 shows the arrangement of the ABS actuator previously proposed by the inventor.

An ABS actuator 1100 is disposed between a master cylinder and a wheel cylinder in a braking apparatus. The ABS actuator 1100 has a housing 101 with a surface where various control valves 102 and 103 are installed. The control valves 102 and 103 control braking fluid flowing in a brake pipe arrangement. The housing 101 has a surface where a motor 104 is installed, which is opposed to the surface where the various control valves 102 and 103 are installed. The motor 104 drives a pump 105.

The housing 101 has a surface where a reservoir 106 is installed, which is different from the surface where the various control valves 102 and 103 are installed and is also different from the surface where the motor 104 is disposed. The housing 101 has a surface where a damper 107 is installed, which is opposed to the surface where the reservoir 106 is installed. This arrangement is effective in downsizing the housing 101 compared with a comparative arrangement in which the reservoir 106 and the damper 107 are installed on the same surface.

The damper 107 is defined by a cylindrical sleeve 111 and a plug-like wall member 112. The cylindrical sleeve 111 has an axis extending in the H direction of FIG. 4. The sleeve 111 is inserted into a cylindrical bore 110 provided at the surface where a port 108 of the wheel cylinder is installed. The cylindrical bore 110 has an axis extending in the H direction of FIG. 4. The plug-like wall member 112 is capable of closing an inlet opening of the bore 110. After the cylindrical sleeve 111 is inserted into the bore 110, the inlet opening of the bore 110 is closed by the plug-like wall member 112. An inside space of the sleeve 111 defines a damper chamber 113.

The sleeve 111 has a stepped portion 111a at a predetermined axial position where the diameter of the sleeve 111 is reduced compared with that of the remaining portion. The diameter of the sleeve 111 at a portion closer to the bottom of the bore 110 is larger than the diameter of the sleeve 111 at a portion closer to an inlet opening of the bore 110. A large-diameter portion 111b of the sleeve 111 is brought into contact with a cylindrical wall of the bore 110. A small-diameter portion 111c is spaced from the cylindrical wall of the bore 110. Thus, a clearance 114 is provided between the small-diameter portion 111c and the cylindrical wall of the bore 110.

Furthermore, the sleeve 111 has a through-hole 111*d* opened at the small-diameter portion 111*c*. The clearance 114 communicates with the damper chamber 113 via the through-hole 111*d*.

The port 109 of the master cylinder is offset from a pressurizing control valve 102 in the H direction of FIG. 4. The pressurizing control valve 102 is located adjacent to the reservoir 106 than the port 109 of the master cylinder.

A conduit line A is a fluid passage connecting the master cylinder to the wheel cylinder. The conduit line A consists of a conduit line A1 and a conduit line A2. The conduit line A1, positioned between the port 109 of the master cylinder and the damper 107, extends straight in an L direction from the port 109 of the master cylinder to the damper 107. In other words, the conduit line A1 extends along an axis of the port 109 of the master cylinder perpendicularly to the surface where the port 109 of the master cylinder is installed. The conduit line A2, positioned between the damper 107 to the pressurizing control valve 102, extends straight from the damper 107 to the pressurizing control valve 102. In other words, the conduit line A2 extends along an axis of the pressurizing control valve 102 perpendicularly to the surface where the pressurizing control valve 102 is installed. Thus, the conduit line A1 is offset from the conduit line A2 in the H direction of FIG. 4. The conduit line A2 is located adjacent to the reservoir 106 than the conduit line A1.

The sleeve 111 is brought into contact with a bottom surface of the plug-like wall member 112 at its contact face 111*e*. The contact face 111*e* of the plug-like wall member 112 is configured into a bell mouth or an annular flange. A distance from the contact face 111*e* to the stepped portion 111*a* is equivalent to an offset amount of the conduit line A1 with respect to the conduit line A2. The conduit line A1 is connected to the conduit line A2 via the clearance 114. The braking fluid in the clearance 114 flows around the cylindrical sleeve 111 from the conduit line A1 to the conduit line A2.

On the other hand, the port 108 of the wheel cylinder is located at a predetermined position from the pressurizing control valve 102. Namely, the pressurizing control valve 102 is spaced from the port 108 by a predetermined distance in the H direction. The distance between the port 108 and the pressurizing control valve 102 is, for example, equivalent to a minimum space (length) for forming the port 108 of the wheel cylinder in the housing 101. This arrangement makes it possible to locate the pressurizing control valve 102 adjacent to the reservoir 106. A distance from the port 108 of the wheel cylinder to the reservoir 106 can be reduced correspondingly. Accordingly, the housing 101 can be downsized in the H-direction of FIG. 4.

The above-described downsizing of the housing 101 in the L and H directions leads to the overall downsizing of the ABS actuator 1100.

The loudness of the noise caused during an ABS operation is dependent on a damper capacity. It is thus desirable to enlarge the damper capacity as much as possible to reduce the ABS noise. Especially, the anti-lock braking system is frequently operated in a cold weather condition. Thus, the need for reducing the ABS noise is very high and serious in cold areas.

However, according to the above-described ABS actuator, the clearance 114 between the sleeve 111 and the cylindrical wall of the bore 111 is formed as an annular fluid passage. This leads to lack of the diameter of the damper chamber 113. Therefore, the damper capacity is substantially restricted to an insufficient value.

First Embodiment

In view of the foregoing, the present invention proposes an improved arrangement of the hydraulic actuator preferably used for controlling braking fluid of an anti-lock braking system.

Hereinafter, a preferred embodiment of the present invention will be explained with reference to FIGS. 1 to 3. This embodiment is based on an ABS actuator comprising a total of eight control valves which is practically known as 8-solenoid type ABS actuator.

Figure 1:
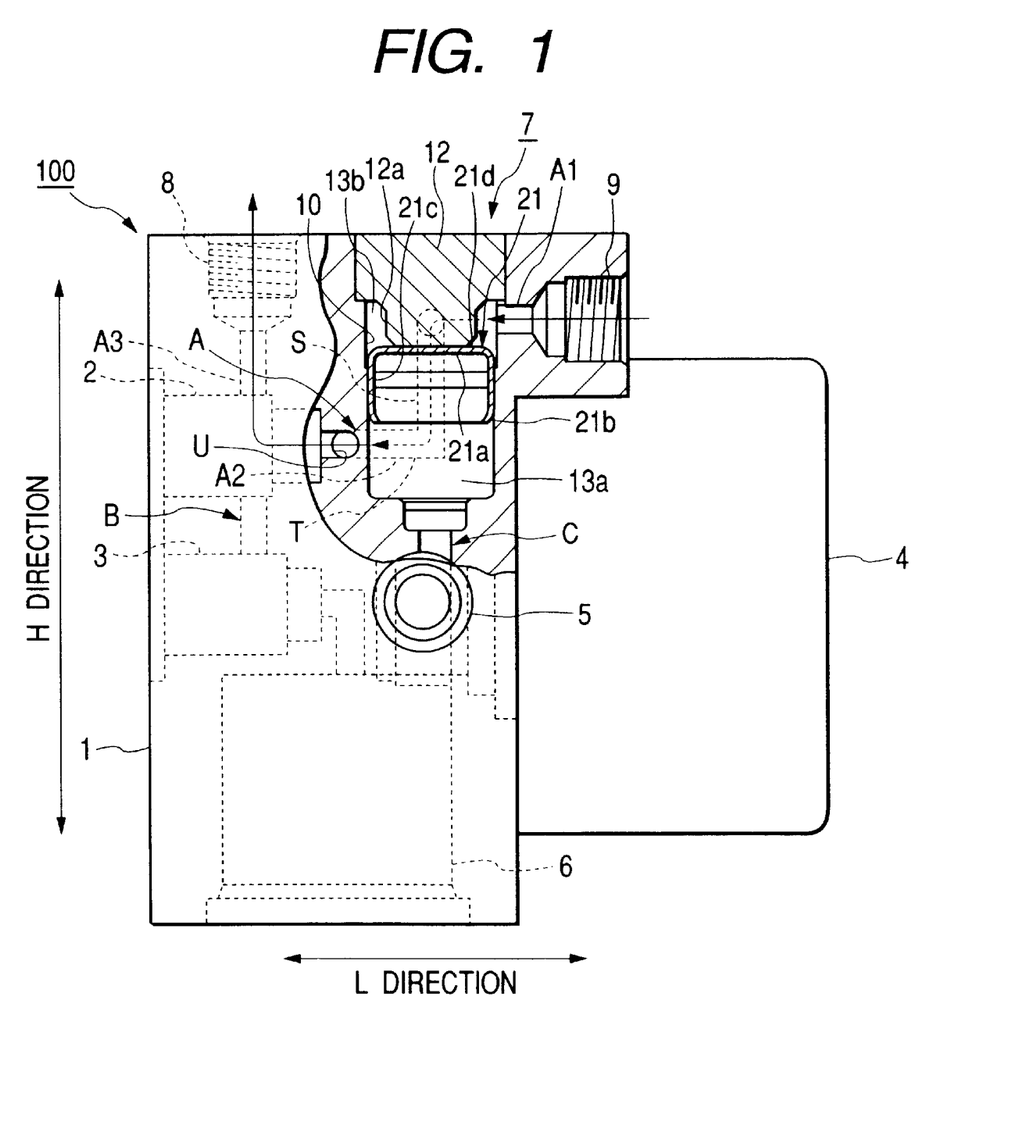
FIG. 1 is a partly cross-sectional view showing an ABS actuator in accordance with a first embodiment of the present invention.

FIG. 1 is a cross-sectional view showing an ABS actuator 100 in accordance with a preferred embodiment of the present invention. Furthermore, FIG. 2 is a plan view showing the ABS actuator seen from the top. The arrangement of the ABS actuator 100 is explained with reference to FIGS. 1 and 2.

The ABS actuator 100 is disposed between a master cylinder (not shown) and a wheel cylinder (not shown). The ABS actuator 100 comprises a housing 1 which is substantially configured into a hexahedral (or a cubic) body with various conduit lines formed therein.

The housing 1 has a surface (i.e., second predetermined surface) where various control valves 2 and 3 are installed. The control valves 2 and 3 are provided to control braking fluid flowing in a brake piping arrangement. Each four of the control valves 2 (3) are aligned in a W direction, as shown in FIG. 2. The W direction is normal to each of H and L directions. Two lines of the control valves 2 and 3, each consisting of four control valves, are arrayed in the H direction as shown in FIG. 1. Thus, a total of eight (=4×2) control valves 2 and 3 are installed in the housing 1.

The housing 1 has a surface (i.e., third predetermined surface) opposed to the above-described surface (i.e., second predetermined surface) where the various control valves 2 and 3 are installed. A motor 4 is installed on this surface (i.e., on the third predetermined surface). The motor 4 is provided to drive a pump 5.

The housing 1 has a surface (i.e., fourth predetermined surface) where a reservoir 6 is installed, which is substantially perpendicular to the surface (i.e., second predetermined surface) where various control valves 2 and 3 are installed and also perpendicular to the surface (i.e., third predetermined surface) where the motor 4 is installed. The housing 1 has a surface (i.e., first predetermined surface) where dampers 7 are installed, which is opposed to the surface where (i.e., fourth predetermined surface) the reservoir 6 is installed.

Figure 2:
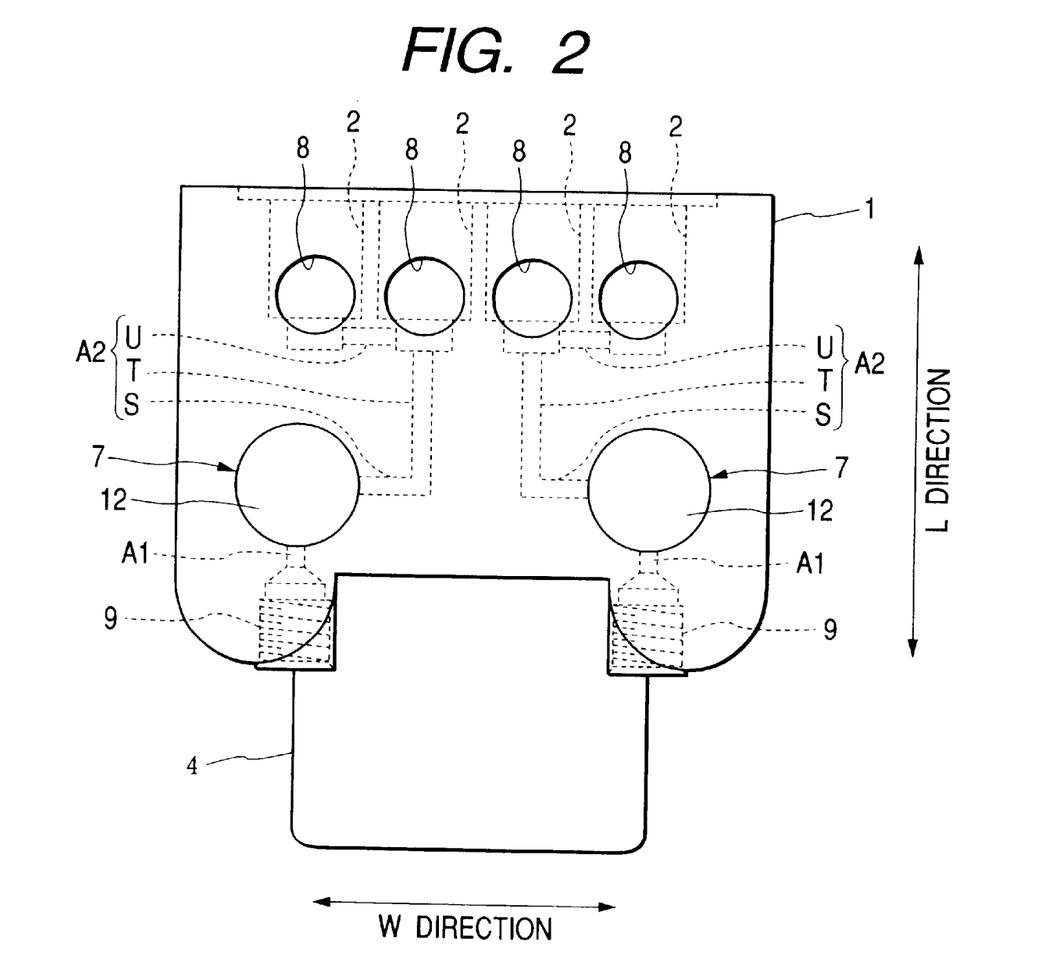
FIG. 2 is a plan view showing the ABS actuator shown in FIG. 1.

Furthermore, as shown in FIG. 2, a total of four ports 8 to be connected to the wheel cylinder are formed on the surface (i.e., first predetermined surface) where the dampers 7 are installed. These ports 8 communicate with pressurizing control valves 2 in the housing 1. Two ports 9 to be connected to the master cylinder are formed on the surface (the third predetermined surface) where the motor 4 is installed. One of two master cylinder ports 9 is connected to two pressurizing control valves 2 positioned at a right side of the housing 1 shown in the plan view of FIG. 2. The other of two master cylinder ports 9 is connected to two pressurizing control valves 2 positioned at a left side of the housing 1 shown in the plan view of FIG. 2. These two ports 9 are offset from the pressurizing control valves 2 in the H direction as apparent from FIG. 1. Compared with the position of the master cylinder ports 9, the pressurizing control valves 2 are located far from the surface (i.e., the first predetermined surface) where the dampers 7 are installed.

Hereinafter, a detailed connecting arrangement of the above-described components will be explained.

Each master cylinder port 9 communicates via a conduit line A with the corresponding wheel cylinder ports 8. The pressurizing control valve 2, provided in the conduit line A, opens or closes the conduit line A. The conduit line A is connected to a conduit line B at a predetermined portion between the pressurizing control valve 2 and the wheel cylinder. The conduit line B is connected to the reservoir 6. The depressurizing control valve 3, provided in the conduit line B, controls braking fluid supplied to the reservoir 6.

The conduit line A is connected to the reservoir 6 at a portion between the master cylinder and the pressurizing control valve 2 via a conduit line C. The braking fluid, discharged into the reservoir 6, is returned to the conduit line A via the conduit line C. The pump 5 and the dampers 7 are provided in the conduit C to introduce and discharge braking fluid into and from the reservoir 6.

More specifically, each damper 7 is inserted into a bore 10. The bore 10 has a cylindrical shape with an axis of the bore 10 extending in the H direction. The cylindrical bore 10 is, for example, formed by partly drilling or machining the housing 1 from the surface (i.e., first predetermined surface) where the wheel cylinder ports 8 are formed. Each damper 7 is installed in the following manner.

First, a cup-shaped diaphragm 21 is inserted into the cylindrical bore 10 so that the cup-shaped diaphragm 21 is settled in an inner portion (i.e., a bottom side) of the cylindrical bore 10 with an axis of the cup-shaped diaphragm 21 extending in the H direction. Next, a plug-like wall member 12 is inserted into the cylindrical bore 10 to close the inlet opening of the bore 10. The cup-shaped diaphragm 21 divides an inside space of the cylindrical bore 10 into two chambers 13a and 13b. Of two chambers 13a and 13b thus defined, one chamber 13a (i.e., a first chamber) serves as a damper chamber which is connected to the conduit line C. The other chamber 13b (i.e., a second chamber) is connected to the conduit line A.

The cup-shaped diaphragm 21 is configured into a cylindrical cup shape with a circular opening at one axial end thereof (i.e., at the bottom side of the cylindrical bore 10) and a circular bottom 21a at the other axial end thereof. The cup-shaped diaphragm 21 has an axis identical with that of the cylindrical bore 10. The circular opening of the cup-shaped diaphragm 21 becomes a leading side when the cup-shaped diaphragm 21 is inserted into the cylindrical bore 10 in the axial direction. An opening periphery 21b (i.e., an annular opening edge) of the cup-shaped diaphragm 21 is slightly squeezed in diameter compared with the remaining portion (i.e., a cylindrical wall of the cup-shaped diaphragm 21). Providing the opening periphery 21b, being thus curled radially inward, makes it possible to easily insert the cup-shaped diaphragm 21 into the cylindrical bore 10 from the opening side of the cup-shaped diaphragm 21.

Furthermore, the cup-shaped diaphragm 21 has a press-fitting portion 21c partly formed on the cylindrical wall thereof. The press-fitting portion 21c protrudes radially outward from the surface of the cylindrical wall of the cup-shaped diaphragm 21. The press-fitting portion 21c extends in a circumferential direction of the cylindrical wall of the cup-shaped diaphragm 21 at a height equivalent to a center of the cup-shaped diaphragm 21 (in the axial direction of the cup-shaped diaphragm 21).

The press-fitting portion 21c has an enlarged diameter larger than the diameter of the remaining portion of the cylindrical wall of the cup-shaped diaphragm 21. When the cup-shaped diaphragm 21 is inserted into the cylindrical bore 10, the press-fitting portion 21c is pressed into the cylindrical bore 10. So, the cup-shaped diaphragm 21 is firmly fixed in the cylindrical bore 10 of the housing 1.

Furthermore, the cup-shaped diaphragm 21 has a through-hole 21d, serving as an orifice, opened across a plate of the bottom 21a. Two chambers 13a and 13b, separated by the cup-shaped diaphragm 21, communicate with each other via the through-hole 21d. In other words, the conduit line C is connected to the conduit line A via the through-hole 21d.

Figure 3:
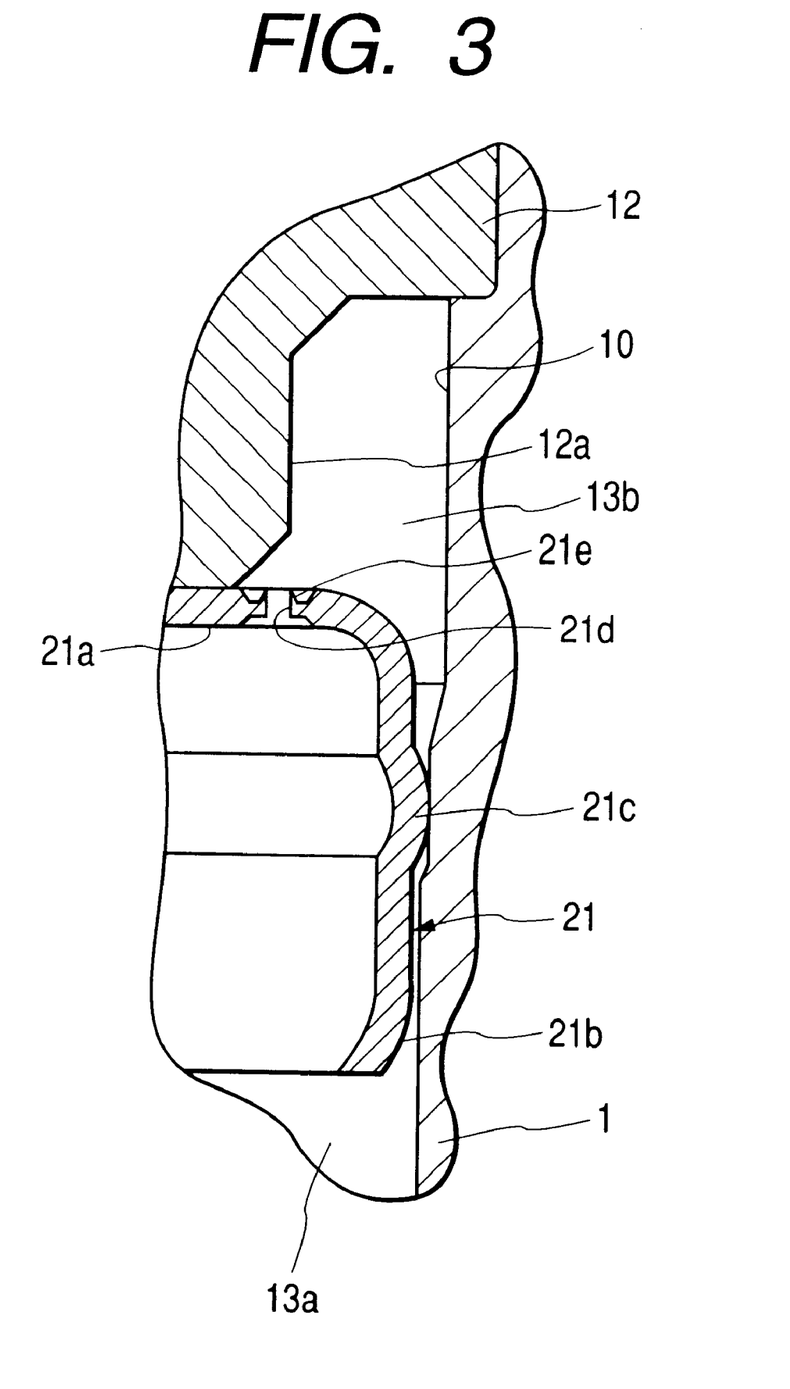
FIG. 3 is an enlarged cross-sectional view showing a through-hole and its vicinity of the ABS actuator shown in FIG. 1.

FIG. 3 is an enlarged view of the through-hole 21d and its vicinity. A region where the through-hole 21d is provided is thin in thickness compared with the remaining portion of the bottom 21a. For example, the thinned or recessed region surrounding the through-hole 21d can be easily formed by partly pressing the bottom 21a of the cup-shaped diaphragm 21. Providing the thinned or recessed region for the through-hole 21d on the bottom 21a is advantageous to prevent a burr 21e from protruding from the surface of the bottom 21a. The burr 21e is inherently produced along an annular periphery of the through-hole 21d when a drilling or machining operation is applied on the bottom 21a for formation of the through-hole 21d. If any force is applied on the burr 21e, the burr 21e may peel off the cup-shaped diaphragm 21. However, this arrangement surely prevents the burr 21e from peeling off the cup-shaped diaphragm 21 since the burr 21e stays or remains in a retracted position with respect to the surface of the bottom 21a.

The plug-like wall member 12 has a cylindrical main body (refer to FIG. 2) which corresponds to the cylindrical bore 10. Furthermore, as shown in FIG. 1, a circular protruding portion 12a is formed at an inner end of the plug-like wall member 12. The circular protruding portion 12a has a diameter smaller than that of the main body of the plug-like wall member 12. When the plug-like wall member 12 is inserted into the cylindrical bore 10, the protruding portion 12a presses the bottom 21a of the cup-shaped diaphragm 21. In other words, an insertion amount of the protruding portion 12a determines an axial position of the cup-shaped diaphragm 21 when inserted in the cylindrical bore 10. When the plug-like wall member 12 is inserted in the cylindrical bore 10 so as to close the opening of the bore 10, the cylindrical protruding portion 12a is spaced from the cylindrical wall of the bore 10. So, the chamber 13b surrounds the cylindrical protruding portion 12a of the plug-like wall member 12.

Furthermore, as shown in FIGS. 1 and 2, the conduit line A consists of a conduit line A1 connecting the master cylinder port 9 to the chamber 13b in the cylindrical bore 10, a conduit line A2 connecting the chamber 13b to the pressurizing control valve 2, and a conduit line A3 connecting the pressurizing control valve 2 to the wheel cylinder port 8.

The conduit line A1 extends straight in the L direction from the master cylinder port 9 toward the chamber 13b of the cylindrical bore 10. The master cylinder port 9 is offset from the pressurizing control valve 2 in the H direction. The conduit line A2 comprises a straight conduit line S and a straight conduit line T. The conduit line S extends straight from the cylindrical wall of the bore 10 in both of the H and W directions. In other words, the conduit line S extends obliquely with respect to the axis of the cylindrical bore 10. The conduit line T extends straight from the pressurizing control valve 2 in the L direction and communicates with the conduit line S.

In this manner, the present embodiment forms the straight conduit line S extending in both the H and W directions (i.e., obliquely) from the cylindrical wall of the cylindrical bore 10 constituting the chamber 13b. This makes it possible to connect the master cylinder port 9 and the pressurizing control valve 2 which are offset each other.

As shown in FIG. 2, a conduit line U is provided between two adjacent pressurizing control valves 2 so as to extend in the W direction. The conduit line U connects two inlet ports of the adjacent pressurizing control valves 2 positioned at each of the right and left sides of the housing 1 shown in FIG. 2. Thus, each of two pressurizing control valves 2 located outside of the housing 1 can communicate with the chamber 13b via the conduit line U. The conduit line A3 extends straight from the pressurizing control valve 2 toward the wheel cylinder port 8 which is connected to the wheel cylinder. In this manner. The conduit line A consists of three straight conduit lines A1, A2 and A3.

On the other hand, the wheel cylinder port 8 is located at a predetermined distance from the pressurizing control valve 2. In other words, the wheel cylinder port 8 is spaced in the H direction from the pressurizing control valve 2. The distance from the wheel cylinder port 8 to the pressurizing control valve 2 is, for example, equivalent to a minimum space for forming the wheel cylinder port 8. This arrangement makes it possible to locate the pressurizing control valve 2 adjacently to the reservoir 6. A distance from the wheel cylinder port 8 to the reservoir 6 can be reduced correspondingly.

As explained above, the ABS actuator of the above-described embodiment is characterized in that the cup-shaped diaphragm 21 divides the inside space of the cylindrical bore 10 into the chambers 13a and 13b. One chamber 13a serves as the damper chamber. The other chamber 13b constitutes part of the conduit line A. With this arrangement, the ABS actuator of the above-described embodiment no longer requires the clearance 114 of the annular fluid passage (refer to FIG. 4) which is provided in the ABS actuator previously proposed by the inventor of this application. Hence, the diameter of the damper 7 can be increased to a level equivalent to the diameter of the cylindrical bore 10. This realizes a large capacity of the damper 7. Having a large damper capacity is advantageous in reducing the noise caused during the ABS operation.

Furthermore, as shown in FIG. 1, the ABS actuator of the above-described embodiment comprises the reservoir 6 and the damper 7 disposed on the opposed surfaces of the housing 1. This is advantageous in downsizing the housing 1 in the L direction shown in FIG. 1, like the ABS actuator shown in FIG. 4. Furthermore, the master cylinder port 8 is offset from the pressurizing control valve 2 in the H direction. This offset arrangement produces or secures a space for arranging the port 8 of the wheel cylinder. This is advantageous in downsizing the housing 1 in the H direction shown in FIG. 1, like the ABS actuator shown in FIG. 4.

According to the ABS actuator shown in FIG. 4, the sleeve 111 has a cylindrical body. An edge of the sleeve 111 is pressed by the plug-like wall member 112. So, the sleeve 111 provides the damper chamber 113 partitioned from the conduit line A. However, the braking fluid may leak through a clearance between the sleeve 111 and the plug-like wall member 112. This gives adverse influence to the orifice effect should be brought by the through-hole 111d.

To the contrary, the above-described embodiment employs the cup-shaped diaphragm 21 to provide the chamber 13a serving as the damper chamber which is partitioned from the chamber 13b constituting part of the conduit line A. Employment of the cup-shaped diaphragm 21 ensures the orifice effect brought by the through-hole 21d.

Other Embodiment

According to the above-described embodiment, the master cylinder port 9 is offset from the pressurizing control valve 2. The conduit line T extends 5 obliquely from the cylindrical wall of the bore 10. The housing 1 can be downsized in the H direction in FIG. 1. However, the present invention does not always require the above-described arrangement since it is possible to secure a sufficient damper capacity in a case where the annular fluid passage of the ABS actuator shown in FIG. 4 is not necessary. Even in this case, it is possible to downsize the housing 1 in the L direction of FIG. 1.

The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A hydraulic actuator for an anti-lock braking system comprising:

a housing having a first predetermined surface where a bore is formed;

a damper defined in said bore and having an axis extending in a depth direction of said bore;

a cup-shaped diaphragm disposed in said bore to divide an inside space of the bore into a first chamber and a second chamber, said cup-shaped diaphragm having an opening at one axial end and a bottom at an opposed axial end, said opening of said cup-shaped diaphragm becoming a leading side when said cup-shaped diaphragm is inserted into said bore;

a plug-like wall member closing an opening of said bore;

a damper chamber constituted by said first chamber and including an inside space of said cup-shaped diaphragm;

said housing having a second predetermined surface where at least one control valve is installed, said second predetermined surface being substantially perpendicular to said first predetermined surface;

said housing having a third predetermined surface where a first port is formed, said third predetermined surface being substantially perpendicular to said first predetermined surface and being opposed to said second predetermined surface; and a main conduit line connecting said first port to said control valve, wherein said plug-like wall member has a protruding portion for pushing said bottom of said cup-shaped diaphragm, said protruding portion is spaced from a cylindrical wall of said bore, an annular space is formed between said protruding portion and said cylindrical wall of said bore so as to constitute said second chamber, and a first conduit line has its inlet opened to said annular space provided around said protruding portion and extends from said annular space as part of said main conduit line.

2. A hydraulic actuator for an anti-lock braking system comprising:

a housing having a first predetermined surface where a bore is formed;

a damper defined in said bore and having an axis extending in a depth direction of said bore;

a cup-shaped diaphragm disposed in said bore to divide an inside space of the bore into a first chamber and a second chamber, said cup-shaped diaphragm having an opening at one axial end and a bottom at an opposed axial end, said opening of said cup-shaped diaphragm becoming a leading side when said cup-shaped diaphragm is inserted into said bore;

a plug-like wall member closing an opening of said bore;

a damper chamber constituted by said first chamber and including an inside space of said cup-shaped diaphragm;

said housing having a second predetermined surface where at least one control valve is installed, said second predetermined surface being substantially perpendicular to said first predetermined surface;

said housing having a third predetermined surface where a first port is formed, said third predetermined surface being substantially perpendicular to said first predetermined surface and being opposed to said second predetermined surface;

a second port formed on said first predetermined surface where said damper is installed; and a main conduit line formed in said housing so as to communicate with said second chamber, said main conduit line connecting said first port to said second port via said control valve;

wherein said first port is offset from said control valve in an axial direction of said damper, said control valve is located far from said first predetermined surface compared with said first port, and said main conduit line connects said second chamber to said control valve via a first conduit line extending obliquely with respect to the axis of said damper from a cylindrical wall of said bore.

3. The hydraulic actuator for an anti-lock braking system in accordance with claim 2, wherein said plug-like wall member has a protruding portion for pushing said bottom of said cup-shaped diaphragm, said protruding portion is spaced from said cylindrical wall of said bore, an annular space is formed between said protruding portion and said cylindrical wall of said bore so as to constitute said second chamber, and said first conduit line has its inlet opened to said annular space provided around said protruding portion.

4. The hydraulic actuator for an anti-lock braking system in accordance with claim 1, wherein said main conduit line comprises a second conduit line which extends from said control valve in a direction substantially perpendicular to said second predetermined surface and is connected to said first conduit line.

5. The hydraulic actuator for an anti-lock braking system in accordance with claim 4, wherein two control valves are installed adjacent to each other on said second predetermined surface, one of said two control valves is directly connected to said first conduit line via said second conduit line, and the other of said two control valves is connected to said first conduit line via said second conduit line and a third conduit line connecting said two control valves.

6. The hydraulic actuator for an anti-lock braking system in accordance with claim 1, wherein a through-hole is opened on said bottom of said cup-shaped diaphragm, and said through-hole serves as an orifice connecting said first chamber to said second chamber.

7. The hydraulic actuator for an anti-lock braking system in accordance with claim 6, wherein a region where said through-hole is opened is thin in thickness compared with the remaining portion of said bottom of said cup-shaped diaphragm.

8. The hydraulic actuator for an anti-lock braking system in accordance with claim 1, wherein said cup-shaped diaphragm has a press-fitting portion partly formed on a cylindrical wall thereof, said press-fitting portion has an enlarged diameter larger than the diameter of other portion of said cup-shaped diaphragm, and said cup-shaped diaphragm is firmly fixed in said bore by said press-fitting portion.

9. The hydraulic actuator for an anti-lock braking system in accordance with claim 1, wherein an opening periphery of said cup-shaped diaphragm is squeezed in diameter compared with other portion of said cup-shaped diaphragm.

10. The hydraulic actuator for an anti-lock braking system in accordance with claim 1, wherein said protruding portion of said plug-like wall member is a circular protruding portion formed at an inner end of said plug-like wall member.

11. The hydraulic actuator for an anti-lock braking system in accordance with claim 10, wherein a diameter of said circular protruding portion is smaller than that of a main body of said plug-like wall member.

12. The hydraulic actuator for an anti-lock braking system in accordance with claim 10, wherein said circular protruding portion presses said bottom of said cup-shaped diaphragm when said plug-like wall member is inserted into said bore, so that an insertion amount of said circular protruding portion substantially determines an axial position of said cup-shaped diaphragm in said bore.

13. The hydraulic actuator for an anti-lock braking system in accordance with claim 10, wherein said cylindrical protruding portion is spaced from said cylindrical wall of said bore when said plug-like wall member is placed in said bore so as to close the opening of said bore, so that said second chamber surrounds said cylindrical protruding portion of said plug-like wall member.

14. The hydraulic actuator for an anti-lock braking system in accordance with claim 4, wherein said pressurizing control valve is offset from said annular space provided around said protruding portion of the plug-like wall member in a direction normal to said first predetermined surface, and said first conduit line extends straight and obliquely from said annular space and is connected to said second conduit line.

15. The hydraulic actuator for an anti-lock braking system in accordance with claim 7, wherein a recessed region is formed on said bottom so as to surround said through-hole.

16. The hydraulic actuator for an anti-lock braking system in accordance with claim 15, wherein said recessed region has a sufficient depth so that a burr formed around said through-hole remains in a retracted position with respect to a surface of said bottom.

17. The hydraulic actuator for an anti-lock braking system in accordance with claim 8, wherein said press-fitting portion protrudes radially outward from a surface of said cylindrical wall of said cup-shaped diaphragm.

18. The hydraulic actuator for an anti-lock braking system in accordance with claim 17, wherein said press-fitting portion extends in a circumferential direction of said cylindrical wall of said cup-shaped diaphragm.

19. The hydraulic actuator for an anti-lock braking system in accordance with claim 9, wherein said opening periphery of said cup-shaped diaphragm is curled radially inward so as to have a smaller diameter compared with a cylindrical wall of said cup-shaped diaphragm, so that the cup-shaped diaphragm can be easily inserted into the cylindrical bore from said opening periphery of the cup-shaped diaphragm.

20. The hydraulic actuator for an anti-lock braking system in accordance with claim 1, wherein said cup-shaped diaphragm has a diameter substantially identical with that of said bore.

21. The hydraulic actuator for an anti-lock braking system in accordance with claim 1, wherein said cup-shaped diaphragm has an axis identical with that of said bore.

22. The hydraulic actuator for an anti-lock braking system in accordance with claim 3, wherein said main conduit line comprises a second conduit line which extends from said control valve in a direction substantially perpendicular to said second predetermined surface and is connected to said first conduit line.

23. The hydraulic actuator for an anti-lock braking system in accordance with claim 22, wherein two control valves are installed adjacent to each other on said second predetermined surface, one of said two control valves is directly connected to said first conduit line via said second conduit line, and the other of said two control valves is connected to said first conduit line via said second conduit line and a third conduit line connecting said two control valves.

24. The hydraulic actuator for an anti-lock braking system in accordance with claim 2, wherein a through-hole is opened on said bottom of said cup-shaped diaphragm, and said through-hole serves as an orifice connecting said first chamber to said second chamber.

25. The hydraulic actuator for an anti-lock braking system in accordance with claim 24, wherein a region where said through-hole is opened is thin in thickness compared with the remaining portion of said bottom of said cup-shaped diaphragm.

26. The hydraulic actuator for an anti-lock braking system in accordance with claim 2, wherein said cup-shaped diaphragm has a press-fitting portion partly formed on a cylindrical wall thereof, said press-fitting portion has an enlarged diameter larger than the diameter of other portion of said cup-shaped diaphragm, and said cup-shaped diaphragm is firmly fixed in said bore by said press-fitting portion.

27. The hydraulic actuator for an anti-lock braking system in accordance with claim 2, wherein an opening periphery of said cup-shaped diaphragm is squeezed in diameter compared with other portion of said cup-shaped diaphragm.

28. The hydraulic actuator for an anti-lock braking system in accordance with claim 3, wherein said protruding portion of said plug-like wall member is a circular protruding portion formed at an inner end of said plug-like wall member.

29. The hydraulic actuator for an anti-lock braking system in accordance with claim 28, wherein a diameter of said circular protruding portion is smaller than that of a main body of said plug-like wall member.

30. The hydraulic actuator for an anti-lock braking system in accordance with claim 28, wherein said circular protruding portion presses said bottom of said cup-shaped diaphragm when said plug-like wall member is inserted into said bore, so that an insertion amount of said circular protruding portion substantially determines an axial position of said cup-shaped diaphragm in said bore.

31. The hydraulic actuator for an anti-lock braking system in accordance with claim 28, wherein said cylindrical protruding portion is spaced from said cylindrical wall of said bore when said plug-like wall member is placed in said bore so as to close the opening of said bore, so that said second chamber surrounds said cylindrical protruding portion of said plug-like wall member.

32. The hydraulic actuator for an anti-lock braking system in accordance with claim 22, wherein said pressurizing control valve is offset from said annular space provided around said protruding portion of the plug-like wall member in a direction normal to said first predetermined surface, and said first conduit line extends straight and obliquely from said annular space and is connected to said second conduit line.

33. The hydraulic actuator for an anti-lock braking system in accordance with claim 25, wherein a recessed region is formed on said bottom so as to surround said through-hole.

34. The hydraulic actuator for an anti-lock braking system in accordance with claim 33, wherein said recessed region has a sufficient depth so that a burr formed around said through-hole remains in a retracted position with respect to a surface of said bottom.

35. The hydraulic actuator for an anti-lock braking system in accordance with claim 26, wherein said press-fitting portion protrudes radially outward from a surface of said cylindrical wall of said cup-shaped diaphragm.

36. The hydraulic actuator for an anti-lock braking system in accordance with claim 35, wherein said press-fitting portion extends in a circumferential direction of said cylindrical wall of said cup-shaped diaphragm.

37. The hydraulic actuator for an anti-lock braking system in accordance with claim 27, wherein said opening periphery of said cup-shaped diaphragm is curled radially inward so as to have a smaller diameter compared with a cylindrical wall of said cup-shaped diaphragm, so that the cup-shaped diaphragm can be easily inserted into the cylindrical bore from said opening periphery of the cup-shaped diaphragm.

38. The hydraulic actuator for an anti-lock braking system in accordance with claim 2, wherein said cup-shaped diaphragm has a diameter substantially identical with that of said bore.

39. The hydraulic actuator for an anti-lock braking system in accordance with claim 2, wherein said cup-shaped diaphragm has an axis identical with that of said bore.

* * * * *